(12) United States Patent
Matsuzuki

(10) Patent No.: US 9,296,634 B2
(45) Date of Patent: Mar. 29, 2016

(54) DEVICE FOR FORMING GLASS PRODUCT

(71) Applicant: Toshiba Kikai Kabushiki Kaisha, Chiyoda-ku, Tokyo (JP)

(72) Inventor: Isao Matsuzuki, Shizuoka-ken (JP)

(73) Assignee: Toshiba Kikai Kabushiki Kaisha, Chiyoda-ku, Toyko (*) Notice: Subject to any disclaimer, the term of this patent is extended or adjusted under 35 U.S.C. 154(b) by 0 days.

(21) Appl. No.: 14/485,258

(22) Filed: Sep. 12, 2014

(65) Prior Publication Data

US 2015/0080205 A1    Mar. 19, 2015

(30) Foreign Application Priority Data

Sep. 17, 2013   (JP) ................. 2013-191623

(51) Int. Cl.
*C03B 11/00* (2006.01)
*C03C 3/00* (2006.01)

(52) U.S. Cl.
CPC ............... *C03B 11/005* (2013.01); *C03C 3/00* (2013.01); *C03B 2215/73* (2013.01); *C03B 2215/86* (2013.01)

(58) Field of Classification Search
USPC ....................................... 65/268, 306; 501/11
IPC .................................. C03B 11/00; C03C 3/00
See application file for complete search history.

(56) References Cited

U.S. PATENT DOCUMENTS

| | | | | |
|---|---|---|---|---|
| 6,370,918 B2 * | 4/2002 | Fukuyama | ................. | 425/174.4 |
| 6,823,697 B2 * | 11/2004 | Fukuyama | ............ | C03B 11/005 65/308 |
| 7,336,424 B2 * | 2/2008 | Yoneda | ................. | C03B 11/005 359/642 |
| 7,415,843 B2 * | 8/2008 | Yoneda | ................. | C03B 11/005 65/102 |
| 7,503,189 B2 * | 3/2009 | Fukuyama | ............ | C03B 11/005 65/157 |
| 2005/0178157 A1 * | 8/2005 | Yoneda | ................. | C03B 11/005 65/32.1 |
| 2007/0206290 A1 * | 9/2007 | Yoneda | ................. | C03B 11/005 359/642 |

FOREIGN PATENT DOCUMENTS

JP        2006-199537         8/2006

OTHER PUBLICATIONS

English Language Abstract for JP 2006-199537 published Aug. 3, 2006.
English Language Translation for JP 2006-199537 published Aug. 3, 2006.

* cited by examiner

*Primary Examiner* — Mark Halpern
(74) *Attorney, Agent, or Firm* — DLA Piper LLP (US)

(57) ABSTRACT

A device for forming a glass semi-product loaded in a die set is comprised of: a first chamber enclosing a heating zone, a waiting zone and a cooling zone arranged in a row along a first direction and being controllable of an atmosphere in the first chamber; a second chamber in spatial communication with the first chamber and closable so as to keep vacuum in the second chamber, the second chamber so neighboring on the waiting zone as to receive the die set moving from the waiting zone in a second direction perpendicular to the first direction; and a ram disposed in the second chamber and movable to get contact with the die set and carry out press-forming on the glass semi-product in the vacuum kept in the second chamber.

6 Claims, 10 Drawing Sheets

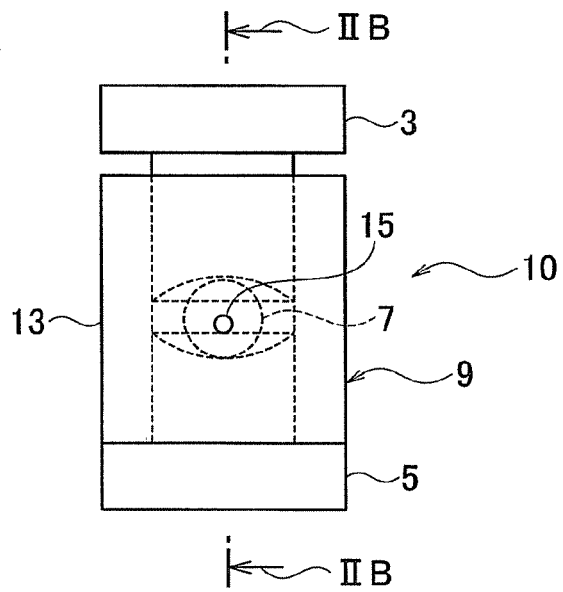
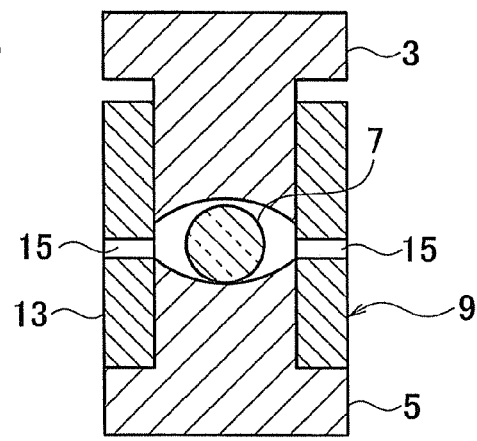
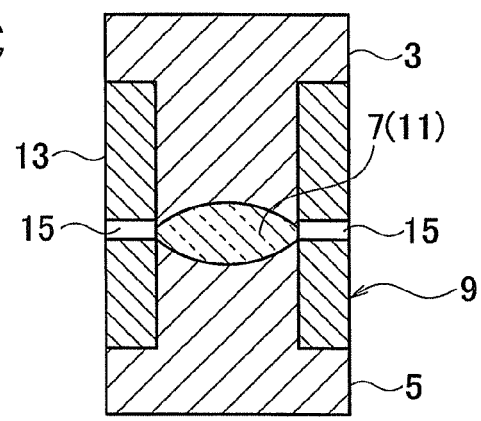

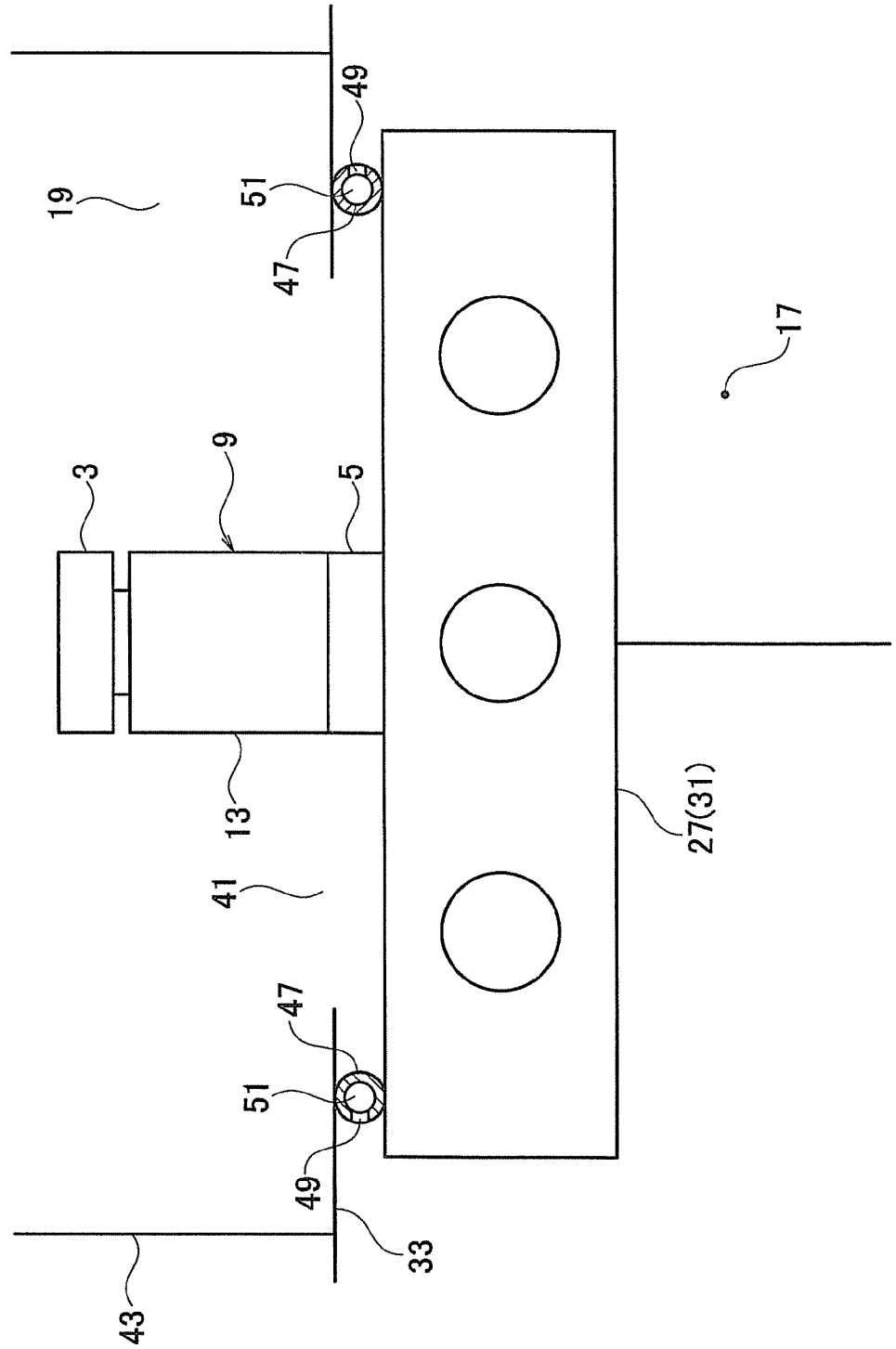

US 9,296,634 B2

DEVICE FOR FORMING GLASS PRODUCT

CROSS-REFERENCE TO RELATED APPLICATIONS

This application is based upon and claims the benefit of priority from the prior Japanese Patent Application No. 2013-191623 (filed Sep. 17, 2013); the entire contents of which are incorporated herein by reference.

BACKGROUND OF THE INVENTION

1. Field of the Invention

The present invention relates to a device for forming a glass product and the glass product produced thereby.

2. Description of the Related Art

There has been a proposed glass-forming device such as one disclosed in Japanese Patent Application Laid-open No. 2006-199537. The device disclosed therein is schematically shown in FIG. 10 of the appended drawings. The art disclosed therein employs inert gas to prevent oxidation of dies and/or glass.

SUMMARY OF THE INVENTION

The present inventor has found in the aforementioned art that the inert gas left in the dies often infiltrates into the glass in the course of forming and then disturbs formation of smooth surfaces or microstructures thereon, which are necessary to develop desired optical properties. The present inventor has found that this could be a source of a problem of inferior products and reached the present invention in order to solve this problem.

According to an aspect of the present invention, a device for forming a glass semi-product loaded in a die set is comprised of: a first chamber enclosing a heating zone, a waiting zone and a cooling zone arranged in a row along a first direction and being controllable of an atmosphere in the first chamber; a second chamber in spatial communication with the first chamber and closable so as to keep vacuum in the second chamber, the second chamber so neighboring on the waiting zone as to receive the die set moving from the waiting zone in a second direction perpendicular to the first direction; and a ram disposed in the second chamber and movable to get contact with the die set and carry out press-forming on the glass semi-product in the vacuum kept in the second chamber.

BRIEF DESCRIPTION OF THE DRAWINGS

FIG. 2A is an elevational view of a die set for press forming, which shows a state before executing the press forming.

FIG. 2B is an elevational sectional view of the die set along with a glass semi-product, which is taken from a line IIB-IIB in FIG. 2A.

FIG. 2C is an elevational sectional view of the die set along with the glass semi-product just after executing the press forming.

FIG. 9 is an enlarged elevational view of a part IX shown in FIG. 5A.

DETAILED DESCRIPTION OF THE PREFERRED EMBODIMENT

Certain embodiments of the present invention will be described hereinafter with reference to the appended drawings.

Figure 1:
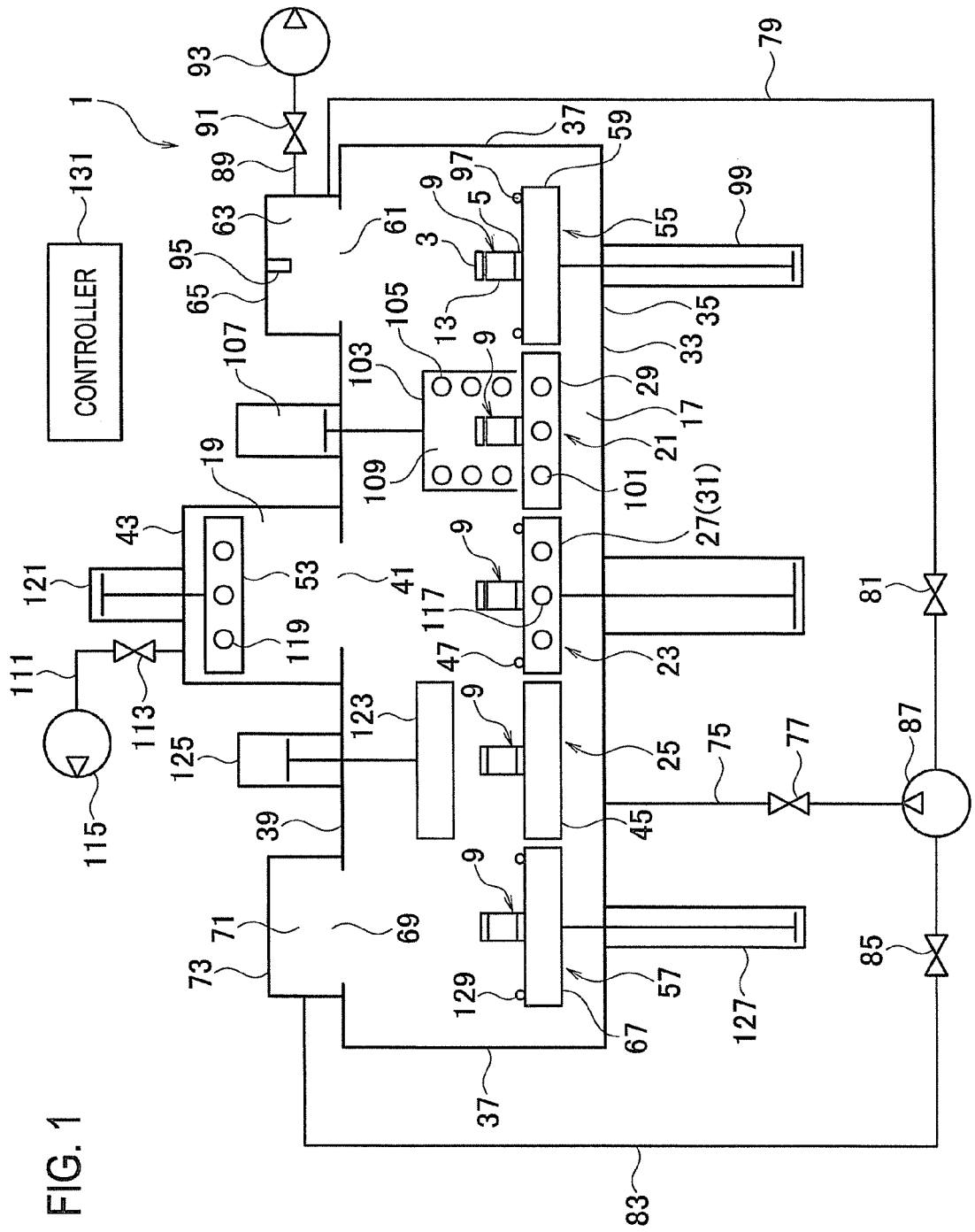
FIG. 1 is a block diagram of a device for forming glass in accordance with an embodiment of the present invention.

Referring mainly to FIG. 1, a device 1 of the present embodiment is to press a die module 9 where a glass semi-product 7 is loaded in a die set 10 to produce a glass final product 11 such as an optical element, or an aspherical lens in particular.

Referring mainly to FIG. 2A, the die set 10 is comprised of multiple die components, such as an upper die 3, a lower die 5 and a sleeve 13 for instance. The sleeve 13, as being formed in a tubular shape, guides the upper die 3 and/or the lower die 5 along a vertical direction.

Referring mainly to FIG. 2B, these die components define a cavity therein, in which the glass semi-product 7 is housed and subject to press-forming. The upper die 3 is removed to receive the glass semi-product 7 into the cavity and is thereafter assembled again with the other die components to form the die module 9 including the semi-product 7. The die module 9 as a whole is subject to heating, pressing (see FIG. 2C), and cooling, thereby the glass semi-product 7 is formed.

The sleeve 13 may have a vent 15. Further the die components, particularly on a lower surface of the upper die 3 and an upper surface of the lower die 5, may have microstructures for forming microstructures on surfaces of a glass final product, which have dimensions smaller than wavelengths of optical rays so as to reduce reflection thereon or to improve any optical properties thereof.

The device 1 is comprised of a main chamber 17 for heating and cooling the die module 9 and a sub-chamber 19 for keeping a vacuum therein and executing the press-forming in a vacuum.

The main chamber 17 has a gas-tight chassis so as to control an atmosphere therein. The main chamber 17 is, when in use, filled with an inert gas such as nitrogen in order to prevent oxidation of the die components and the glass semi-product.

The main chamber 17 may be, although various shapes are possible, formed as a rectangular cuboid. The main chamber 17 is enclosed by a chassis 33, which may be comprised of a flat rectangular bottom 35, four side walls 37 respectively standing upright on sides of the bottom 37, and a flat rectangular top wall 39 above the side walls 37. The top wall 39 has through-holes described later.

The main chamber 17 encloses a heating zone 21, a waiting zone 23 and a cooling zone 25. Partitions among these zones are unnecessary. These zones are arranged in a row, particularly in a linear row in this order. The row is generally horizontal but may be oriented in an arbitrary direction.

The heating zone 21 is to heat the die module 9 up to a temperature adapted for the press-forming and has equipment necessary therefor as described later.

The waiting zone 23 is disposed next to the heating zone 21 and is to temporarily keep the die module 9 transferred from the heating zone 21 waiting here before and after the press-forming.

The cooling zone 25 is disposed next to the waiting zone 23 and is to cool the die module 9 transferred from the waiting zone 23 down to a temperature for solidifying glass, such as 200 degrees C. or lower.

The die module 9 is, in the main chamber 17, transferred from the heating zone 21 via the waiting zone to the cooling zone 25 in general and is halted respectively at these zones. Then the die module 9 is, at the heating zone 21, subject to heating and is, at the cooling zone 25, subject to cooling.

The sub-chamber 19 is to execute the press-forming on the die module 9 in a vacuum atmosphere.

The sub-chamber 19 stands outside the main chamber 17 and is defined by a chassis 43 formed in a rectangular cuboid or any proper shape. The sub-chamber 19 neighbors on the waiting zone 23 and is to some degree apart therefrom in a direction perpendicular to the direction of the row of the zones. Typically, the sub-chamber 19 may be disposed just above the waiting zone 23 or may be alongside horizontally. The sub-chamber 19 can thereby receive the die module 9 moving from the waiting zone 23 in this direction.

The sub-chamber 19 is in spatial communication with the main chamber 17 via a through-hole 41 opened on the top wall 39 of the chassis 33 and can be evacuated when the spatial communication is cut off. The volume of the sub-chamber 19 could be considerably smaller than, for example in the order of 1/10 of, the main chamber 17. This facilitates evacuation of the sub-chamber 19.

The die module 9 after the press-forming is moved back to the waiting zone 23.

The device 1 is, in the chamber main chamber 17, comprised of a movable partition 27, which is initially disposed below the die module 9, or at any proper position. When the partition 27 rests at its lowermost position, it allows spatial communication between the main chamber 17 and the sub-chamber 19. By contrast, when the partition 27 along with the die module 9 moves toward the through-hole 41 to close it, the partition 27 cuts off the spatial communication.

When the spatial communication between the main chamber 17 and the sub-chamber 19 is established, not only the former but also the latter is filled with the inert gas. By contrast, when the spatial communication is cut off, the sub-chamber 19 alone can be evacuated so that the press-forming of the glass semi-product 7 can be executed in the vacuum.

The device 1 is, at the heating zone 21, comprised of a plate-like pedestal 29 on which the die module 9 is placed and heated by a heater 101 described later. Similarly the device 1 is, at the cooling zone 25, comprised of a plate-like pedestal 45 on which the die module 9 is placed and cooled.

The device 1 is, at the waiting zone 21, further comprised of a plate-like pedestal 31 on which the die module 9 is placed and kept waiting here until the press-forming step starts. The pedestal 31 may be provided as an independent element but alternatively the pedestal 31 may double the role of the partition 27 described earlier.

The first through-hole 41 penetrates the top wall 39 of the chassis 33 to establish the spatial communication and is so dimensioned as to allow passage of the die module 9.

The device 1 is comprised of a pneumatic or hydraulic cylinder for moving the pedestal 31 along with the partition 27 upward (or in a horizontal direction). The pedestal 31 is so dimensioned as to close the first through-hole 41 when moving from the waiting zone 21 to the first through-hole 41. In the meantime, the die module 9 is then disposed in the sub-chamber 19 and ready for the press-forming.

The device 1 may be comprised of any sealing 47 such as a metal seal or any heat-resistant O-ring for gas-tightly sealing the sub-chamber 19. The metal seal 47 is a ring-like metal tube, bar or plate surrounding the first through-hole 41. The metal seal 47 may be formed by bending a metal tube in a circular shape and joining both ends thereof.

The metal seal 47 may be disposed on and integrated with the partition 27 (or the pedestal 31) so as to intervene between the partition 27 (or the pedestal 31) and the top wall 39, thereby providing gas-tight closure when the partition 27 (or the pedestal 31) moves upward to close the first through-hole 41. The metal seal 47 may alternatively be disposed on and integrated with the internal surface of the top wall 39. When the sealing spatially isolates the sub-chamber 19, the inside of the metal seal 47 comes to be a part of the sub-chamber 19 and the outside comes to be a part of the main chamber 17.

As described above, the metal seal 47 may be a tubular ring. The metal seal 47 may have one or more through-holes 49 opened outward to communicate the interior of the tube with the main chamber 17. The inert gas in the main chamber 17 gets into the interior through the through-holes 49 and pressure difference relative to the vacuum in the sub-chamber 19 generates force to press the metal seal toward the top wall 39 or the partition 27 (or the pedestal 31). This improves quality of gas-tightness.

The through-holes 49 may be integrated into a single slit that runs the whole length in the circumferential direction of the metal seal 47. Then the cross section of the metal seal 47 exhibits a C-letter shape. This shape produces a spring-like effect to press the metal seal 47 toward the opposite member and thus improves quality of gas-tightness.

The device 1 is, in the sub-chamber 19, comprised of a ram 53 vertically movable, which can get contact with the die module 9. The ram 53, by pinching the die module 9 between the ram 53 and the pedestal 31, carries out the press-forming on the glass semi-product 7 loaded in the die set 10.

To drive the ram 53, the device 1 is comprised of an actuator 121 such as a pneumatic or hydraulic cylinder. In turn, the pneumatic or hydraulic cylinder for driving the pedestal 31 has a locking device that bears pressure by the actuator 121 so as to prevent the pedestal 31 from moving down and the gas-tight closure from being broken.

The main chamber 17 may further define a carry-in zone 55 and a carry-out zone 57, which are arranged respectively at both ends of the row of the zones 21,23,25. The carry-in zone 55 is adjacent to the heating zone 21 and the carry-out zone 57 is adjacent to the cooling zone 25. The zones 55,21,23,25,57 form a linear row along which the die module 9 can move.

The carry-in zone 55 is used to carry the die module 9 into the main chamber 17 and keep it temporarily waiting for a next process. The device 1 is, at the carry-in zone 55, comprised of a pedestal 59 on which the die module 9 is placed.

An import chamber 63 stands outside the main chamber 17 and is defined by a chassis 65 formed in a rectangular cuboid or any proper shape, as with the sub-chamber 19. The import chamber 63 is in spatial communication with the main chamber 17 via a second through-hole 61 opened on the top wall 39 of the chassis 33, which allows passage of the die module 9. The import chamber 63 may neighbor on, and may be for example just above, the carry-in zone 55. If so, the die module 9 introduced into the import chamber 63 can next move vertically to the main chamber 17.

The import chamber 63 is formed atmosphere-controllable and can be evacuated when the spatial communication is cut off. The volume of the import chamber 63 could be considerably smaller than, for example in the order of 1/20 of, the main chamber 17. This facilitates evacuation of the import chamber 63.

The device 1 is comprised of a pneumatic or hydraulic cylinder 99 for vertically moving the pedestal 59. The pedestal 59 is so dimensioned as to close the second through-hole 61 when moving from the carry-in zone 55 to the second through-hole 61. The pedestal 59, as with the pedestal 47, may be comprised of a metal seal 97 in order to gas-tightly close the second through-hole 61.

Figure 3A:
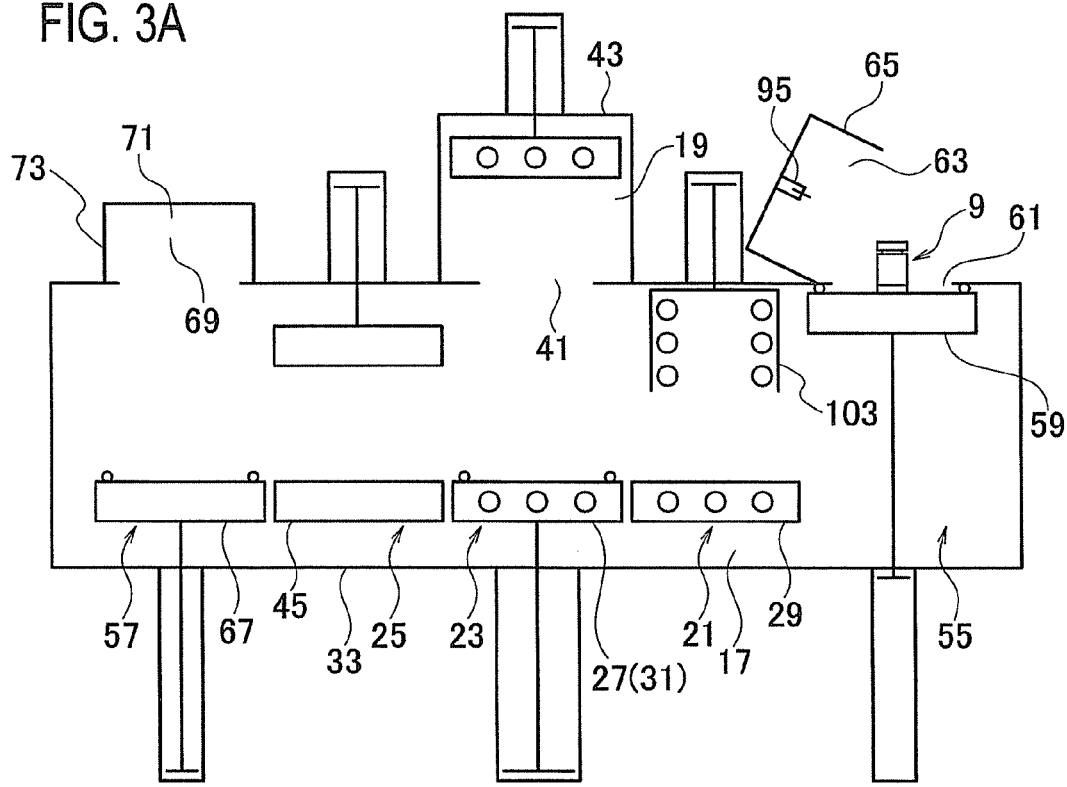
FIG. 3A is a block diagram of the device, where the glass semi-product loaded in the die set is under a carry-in process.

The import chamber 63 can be opened, as shown in FIG. 3A. In order to have it openable, the chassis 65 at an edge thereof may be pivoted on the main chassis 33. When opened, its interior is exposed to the exterior and therefore the die module 9 can be introduced therein. Thus import chamber 63 can be used to carry the die module 9 into the main chamber 17 with keeping the inert gas atmosphere in the main chamber 17.

The carry-out zone 57 is used to keep the die module 9 temporarily waiting and carry the die module 9 out of the main chamber 17. The device 1 is, at the carry-out zone 57, comprised of a pedestal 67 on which the die module 9 is placed.

An export chamber 71 stands outside the main chamber 17 and is defined by a chassis 73 formed in a rectangular cuboid or any proper shape, as with the sub-chamber 19 and the import chamber 63. The export chamber 71 is in spatial communication with the main chamber 17 via a third through-hole 69 opened on the top wall 39 of the chassis 33, which allows passage of the die module 9. The export chamber 71 may neighbor on, and may be for example just above, the carry-out zone 57. If so, the die module 9 moving along with the pedestal 67 can move vertically into the export chamber 71.

The export chamber 71 is formed atmosphere-controllable and is exposable to the exterior when the third through-hole is closed. The volume of the export chamber 71 could be considerably smaller than, for example in the order of 1/20 of, the main chamber 17. This is beneficial in reduction of exhaustion of the inert gas.

The device 1 is comprised of a pneumatic or hydraulic cylinder 127 for vertically moving the pedestal 67. The pedestal 67 is so dimensioned as to close the third through-hole 69 when moving from the carry-out zone 57 to the third through-hole 69. The pedestal 67, as with the pedestals 31,59, may be comprised of a metal seal 129 in order to gas-tightly close the third through-hole 69.

Figure 8A:
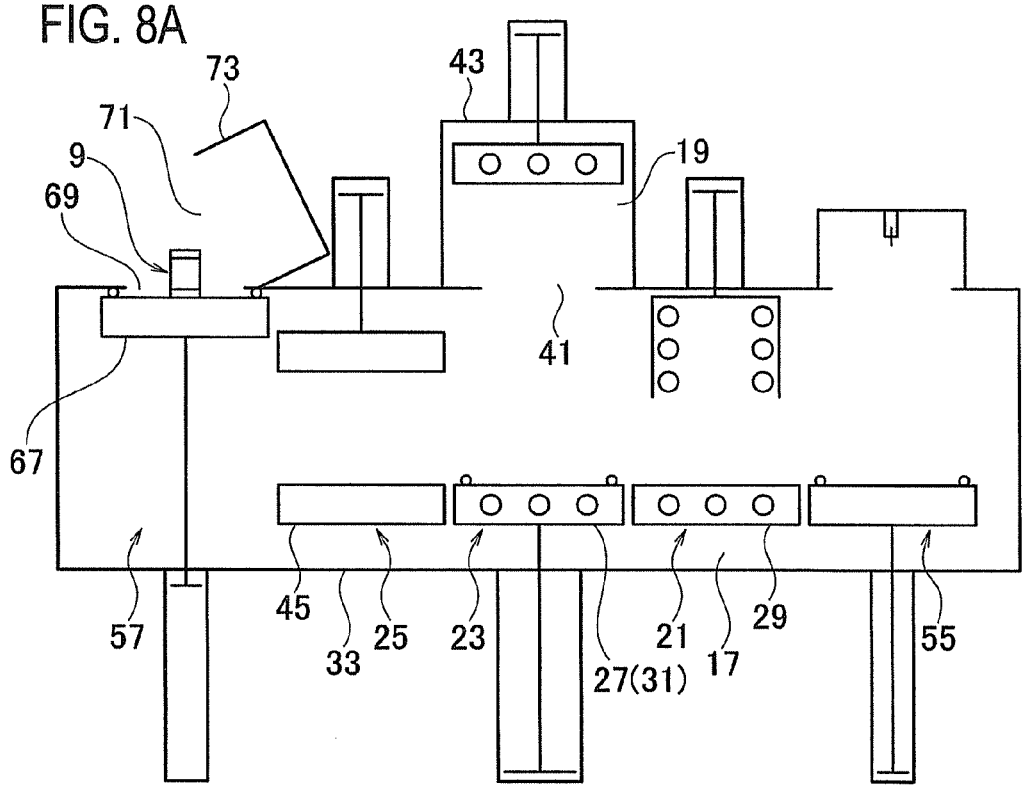
FIG. 8A is a block diagram of the device, where the glass product after forming is under a carry-out process.

The export chamber 71 can be opened, as shown in FIG. 8A. In order to have it openable, the chassis 73 at an edge thereof may be pivoted on the main chassis 33. When opened, its interior is exposed to the exterior and therefore the die module 9 can be carried out. Thus export chamber 71 can be used to carry the die module 9 out of the main chamber 17 with keeping the inert gas atmosphere in the main chamber 17.

In the meantime, the pedestals 31,59,67 resting at these lowermost positions and the immovable pedestals 29,45 are preferably leveled in height. Further, the device 1 is comprised of a conveyor or any robot for transferring the die module 9 among the zones in the main chamber 17 although the conveyor or the robot is not shown in the drawings.

The device 1 is comprised of an inert gas supply unit including tubes 75,79,83, valves 77,81,85, and a pump 87 with a gas container for feeding the inert gas. To the main chamber 17 connected is the tube 75 and the valve 77. When the pump 87 is in operation and the valve 77 is opened, the inert gas such as nitrogen is fed to and then fills the main chamber 17.

The supply unit is connected further to the import chamber 63 via the tube 79 and the valve 81, thereby the import chamber 63 also receives supply of the inert gas and is filled therewith. The same applies to the export chamber 71 by means of the tube 83 and the valve 85.

The sub-chamber 19 is further connected to a vacuum pump 115 via a tube 111 and a valve 113. Therefore the sub-chamber 19 can be evacuated when it is isolated from the main chamber 17. This configuration allows the sub-chamber 19 to execute the press-forming on the die module 9 in a vacuum atmosphere.

The import chamber 63 is similarly connected to a vacuum pump 93 via a tube 89 and a valve 91. Therefore the import chamber 63 can be evacuated when it is isolated from the main chamber 17. This configuration is advantageous in reducing air mixture into the inert gas in the main chamber as the air left in the import chamber 63 can be evacuated before the import chamber 63 gets into spatial communication with the main chamber 17.

The device 1 may be, on the internal face of the upper wall of the chassis 65 for example, comprised of a holddown 95 such as a spring or a repulsive plunger, which holds the introduced die module 9 in place when the pedestal 59 gets elevated and the chassis 65 is closed. The cylinder 99 for driving the pedestal 59 may have a locking device that bears pressure by the holddown 95 so as to prevent the pedestal 59 from moving down.

The device 1 is in addition, at the heating zone 21, comprised of heaters for heating the die module 9. One example thereof is a combination of an embedded heater and a radiation heater. The embedded heater may be a carbon heater 101 or such embedded in the pedestal 29. The radiation heater may have a bell jar 103 and a plurality of infra-red lamps 105 arranged therein for example. The lamps 105 are so arranged as to encircle the die module 9 and the bell jar 103 covers the lamps 105 and the die module 9. Of course, instead, a pair of heaters that pinch the die module 9 is applicable.

The capacity of these heaters is properly selected so that the glass semi-product 7 can be heated up to 650 degrees C. or higher, which is sufficiently hot to soften the glass.

Further, in order to vertically move the bell jar 103, the device is comprised of an actuator such as a pneumatic or hydraulic cylinder 107. When the bell jar 103 is thereby moved down, the die module 9 is placed in a semi-closed space 109 enclosed by the bell jar 103 and heated by the heater 101 and the lamps 105. When the bell jar 103 is moved up, the die module 9 is allowed to move from or to the adjacent zone.

The device 1 is, also at the waiting zone 23 and the sub-chamber 19, comprised of a heater 117 embedded in the pedestal 31 and a heater 119 embedded in the ram 53. Carbon heaters or such may be applied to the heaters 117,119. By means of them, even in the press-forming process, the die module 9 is kept steadily at a temperature preferable to execution of the press-forming.

The device 1 may be comprised of a combination of a cooling ram 123 and a cylinder 125 for actuating the cooling ram 123 so that the cooling ram 123 can be pressed onto the die module 9 at the cooling zone 25. The cooling ram 123 contains a flow path for directing a coolant although not shown in the drawings. Thus the die module 9 is put between the cooling ram 123 and the pedestal 45 and then cooled. Of course cooling here may be executed by heat radiation or any other means.

The device 1 may be further comprised of various detectors such vacuum gauges and thermometers.

Operation of the device 1 is either manually or automatically controlled by means of a controller 131. To enable electric control of the respective elements, electric connections are established from the controller 131 to the conveyor for conveying the die module 9, the cylinders 99,107,121, 125,127, the motors on the pivots of the chassis 65,73, the heaters 101,105,117,119, the pumps 87,93,115, the valves 77,81,85,91,113 and the detectors, although not shown in the drawings. Further the controller 131 may contain a storage for storing algorithm of the automatic control and a processor executing the algorithm.

The operation of the device 1 will be described in more detail hereinafter.

Starting from the state shown in FIG. 3A, the pedestal 59 of the carry-in zone 55 is moved upward and the chassis 65 of the import chamber 63 is pivotally opened so as to expose the import chamber 63. Both the pedestal 31 of the waiting zone 23 and the pedestal 67 of the carry-out zone 57 rest at the lowermost positions. Both the bell jar 103 of the heating zone 21 and the cooling ram 123 of the cooling zone 25 are moved upward. The chassis 73 of the export chamber 71 is pivotally closed so as to gas-tightly seal the export chamber 71 and the main chamber 17.

The pump 87 and the valve 77,85 are operated to fill the export chamber 71 and the main chamber 17 with the inert gas. In parallel, a glass semi-product 7 is loaded into the die set 10 to form a die module 9 as shown in FIGS. 2A and 2B.

Then the die module 9 is placed on the pedestal 59 by hands or any conveyor means not shown.

Figure 3B:
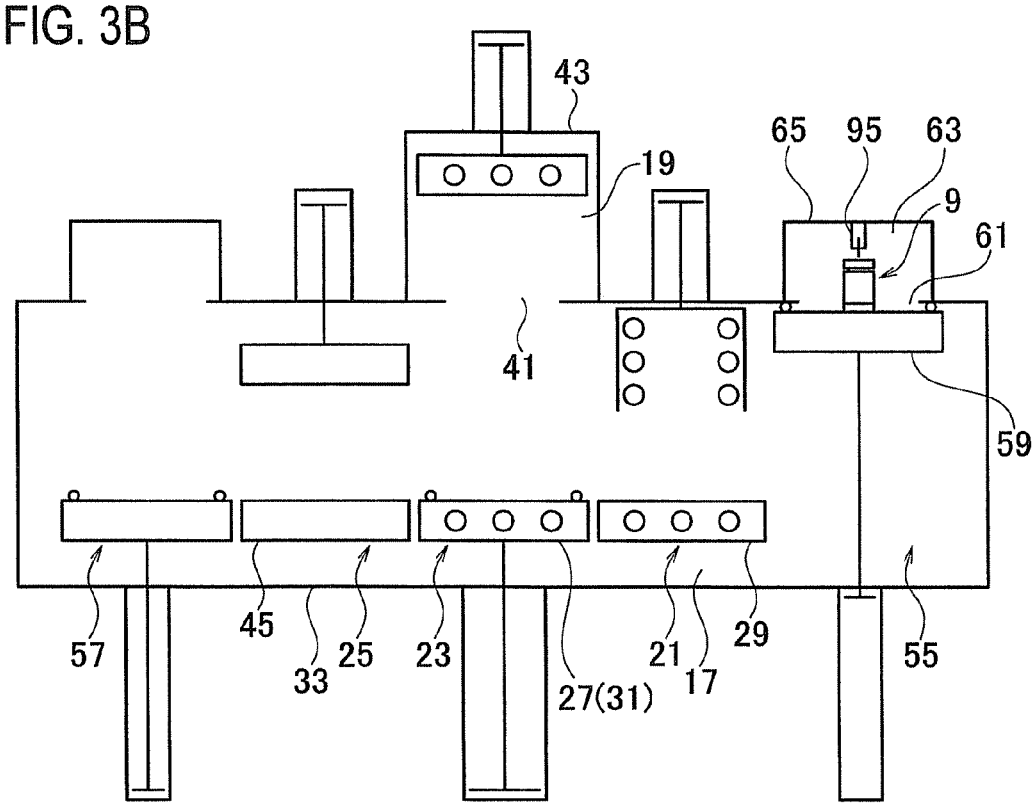
FIG. 3B is a block diagram of the device, where a carry-in sub-chamber is closed.

Referring to FIG. 3B, the motor on the pivot of the chassis 65 is operated to pivotally close the chassis 65 so as to gas-tightly enclose the import chamber 63. The pump 93 and the valve 91 are operated to evacuate the import chamber 63. The pump 93 and the valve 91 are reversely operated and the valve 81 is operated to fill the import chamber 63 with the inert gas.

Figure 4A:
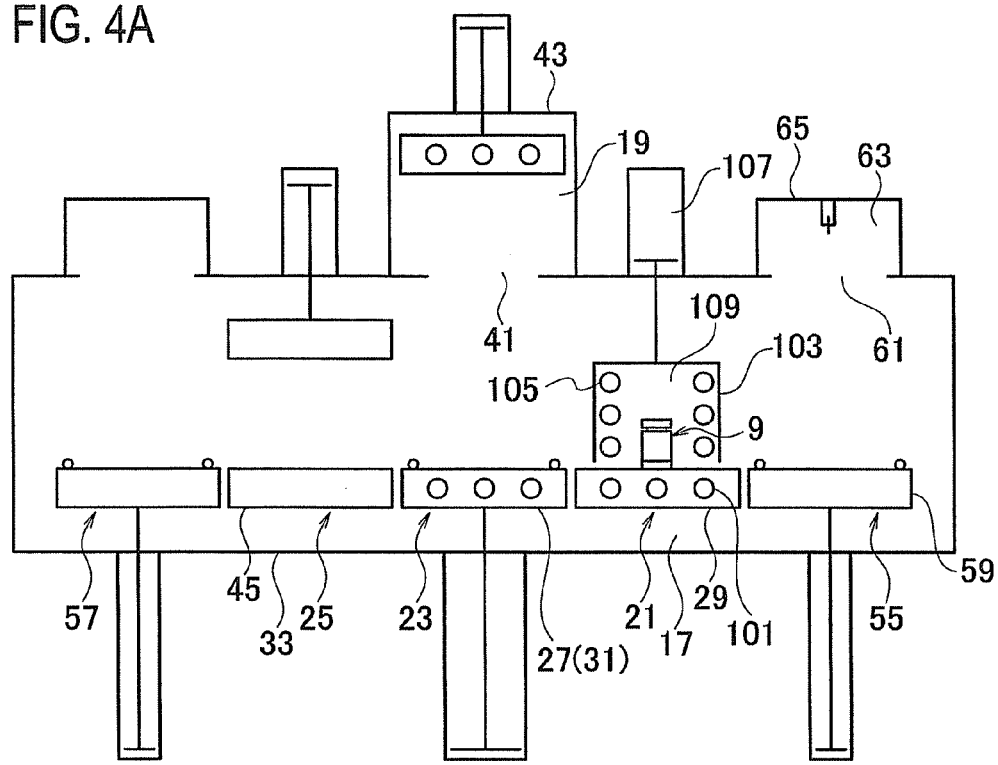
FIG. 4A is a block diagram of the device, where the glass semi-product is transferred to and heated at a heating zone.

Referring to FIG. 4A, the cylinder 99 is operated to move the pedestal 59 down, the conveyor is operated to transfer the die module 9 from the carry-in zone 55 to the heating zone 21. Subsequently the cylinder 107 is operated to move the bell jar 103 down so that the semi-closed space 109 surrounds the die module 9 placed on the pedestal 29. Then the heater 101 and the infra-red lamps 105 are operated to heat the die module 9 up to a required temperature such as 650 degrees C. or more.

Figure 4B:
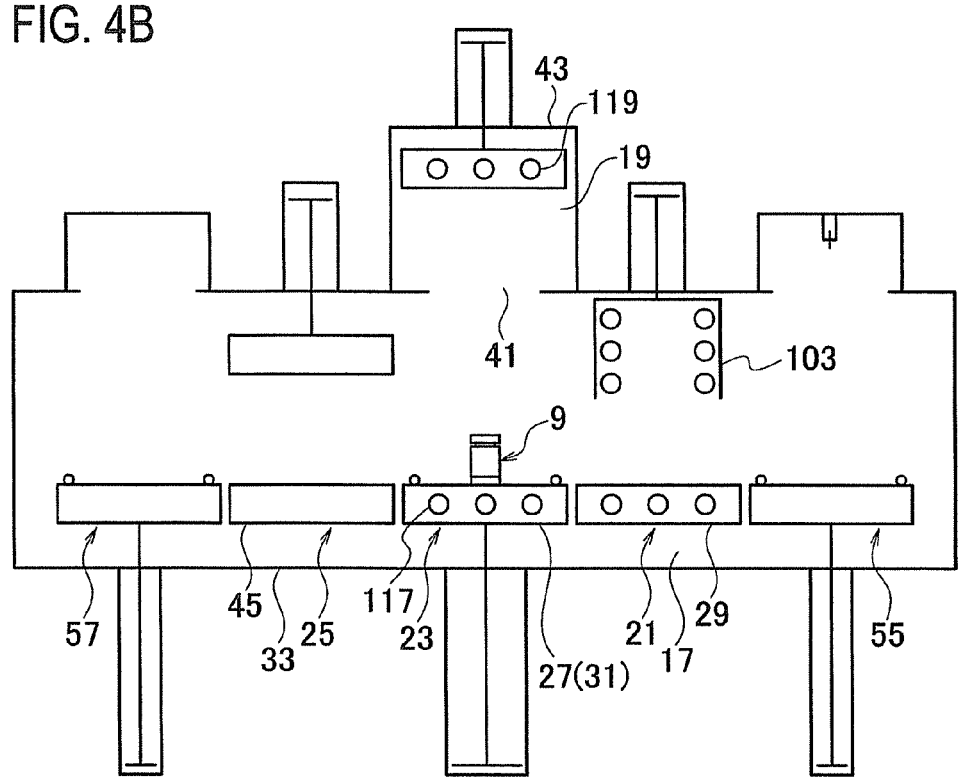
FIG. 4B is a block diagram of the device, where the glass semi-product is transferred to a waiting zone.

Referring to FIG. 4B, when the required temperature is reached, the cylinder 107 is reversely operated to move the bell jar 103 up and the conveyor is operated to transfer the die module 9 from the heating zone 21 to the waiting zone 23. The heater 117 is in advance operated to be switched on.

Figure 5A:
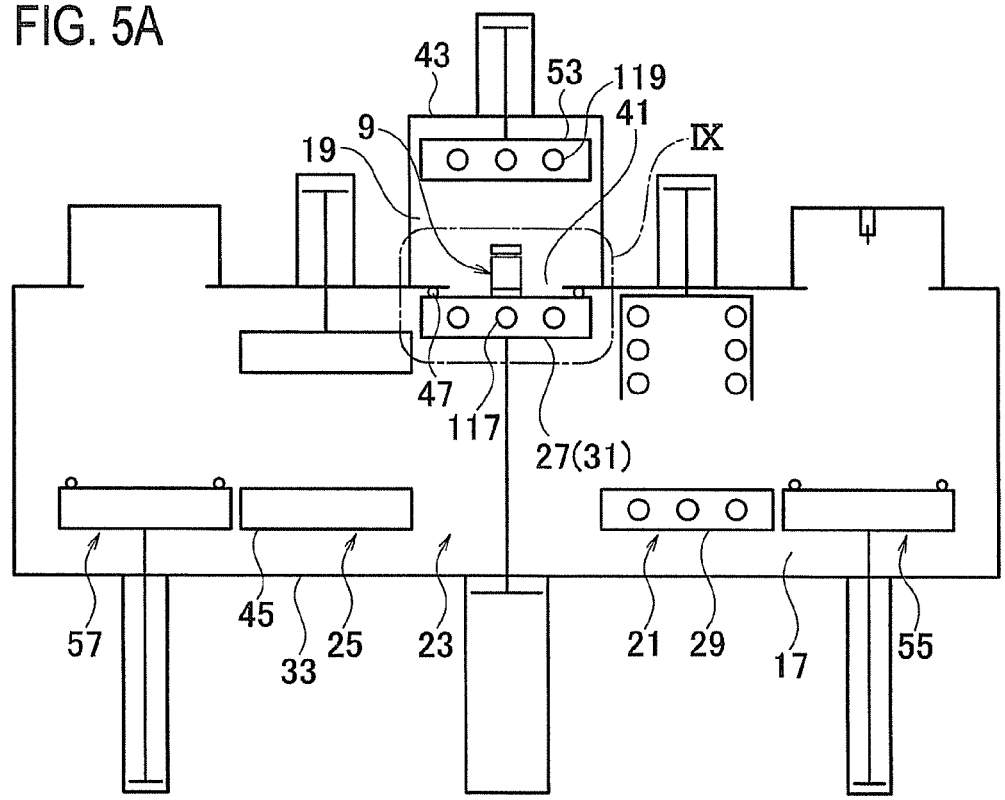
FIG. 5A is a block diagram of the device, where a pedestal carrying the glass semi-product moves up to insert the die set along with the glass semi-product into a vacuum forming sub-chamber.

Referring to FIG. 5A, the cylinder for the waiting zone 23 is operated to move the pedestal 31 up so that the die module 9 placed on the pedestal 31 is introduced into the sub-chamber 19 and the pedestal 31 gas-tightly closes the first through-hole 41. The pump 115 and the valve 113 are operated to evacuate the sub-chamber 19. The heater 119 is simultaneously or in advance operated to be switched on.

Figure 5B:
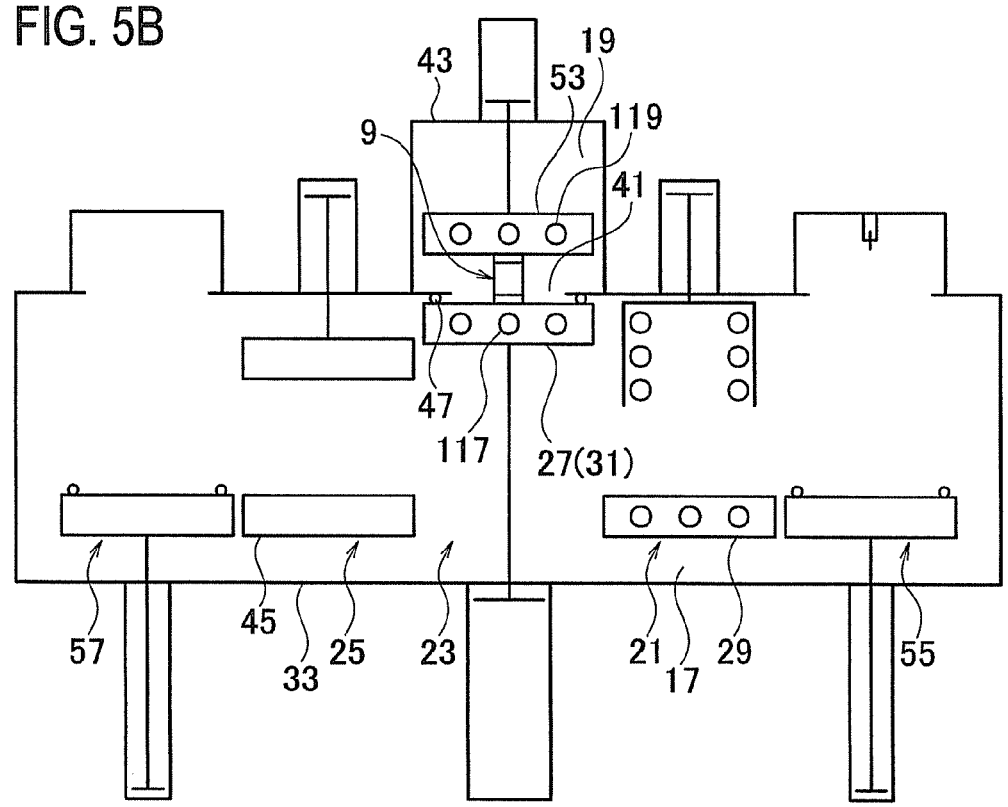
FIG. 5B is a block diagram of the device, where the glass semi-product is press-formed in the vacuum forming sub-chamber.

Referring to FIG. 5B, the cylinder 121 is operated to move the ram 53 down so as to execute press-forming on the die module 9 by pinching it between the ram 53 and the pedestal 31 in the vacuum atmosphere. By executing the press-forming, the glass semi-product 7 is formed into a formed product 11 as shown in FIG. 2C.

Figure 6A:
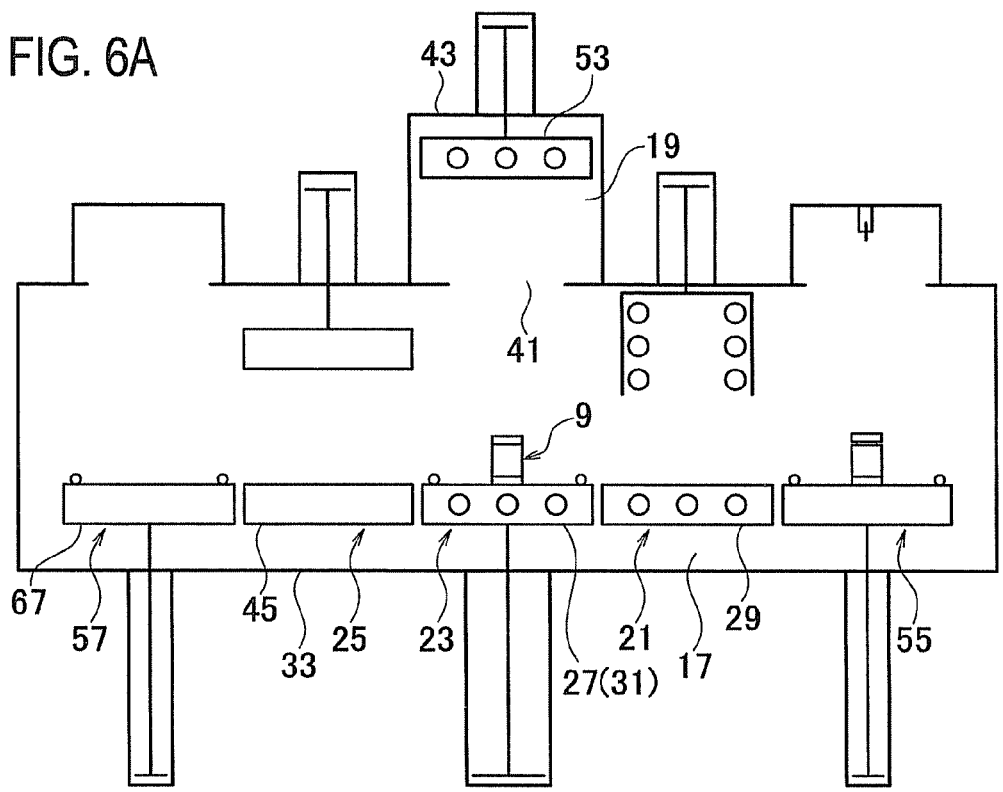
FIG. 6A is a block diagram of the device, where the pedestal goes back to the waiting zone.

Referring to FIG. 6A, the cylinder for the waiting zone 23 is reversely operated to move the pedestal 31 down so that the die module 9 goes back to the waiting zone 23.

Figure 6B:
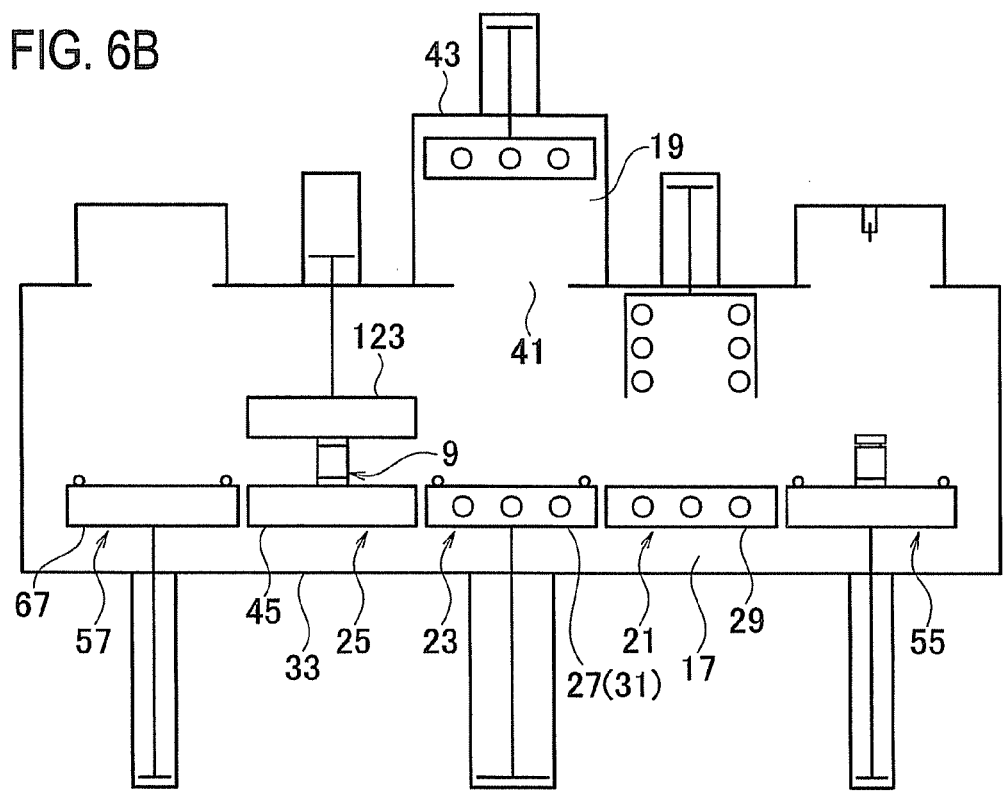
FIG. 6B is a block diagram of the device, where the glass semi-product is transferred to and cooled at a cooling zone.

Referring to FIG. 6B, the conveyor is operated to transfer the die module 9 from the waiting zone 23 to the cooling zone 25. Subsequently the cylinder 125 is operated to move the cooling ram 123 down so that the cooling ram 123 comes in contact with the die module 9 placed on the pedestal 45. Then the die module 9 is put between the cooling ram 123 and the pedestal 45 and thereby cooled.

Figure 7A:
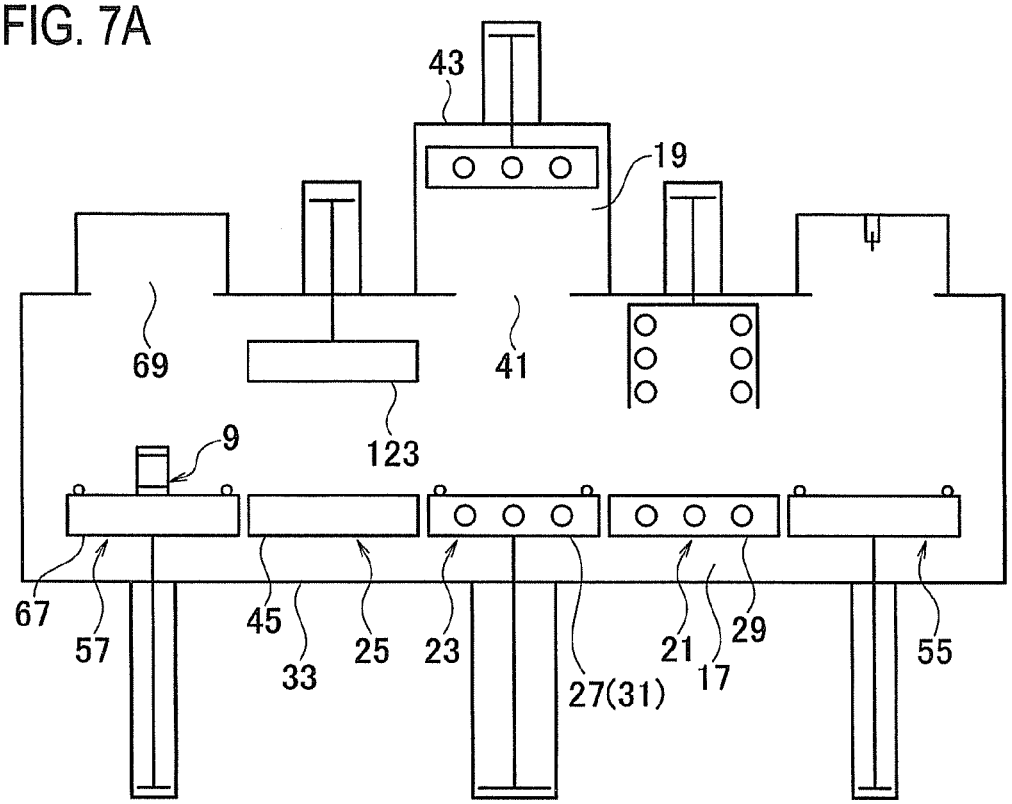
FIG. 7A is a block diagram of the device, where the glass semi-product is transferred to a carry-out zone.

Referring to FIG. 7A, the cylinder 125 is reversely operated to move the cooling ram 123 up and the conveyor is operated to transfer the die module 9 from the cooling zone 25 to the carry-out zone 57.

Figure 7B:
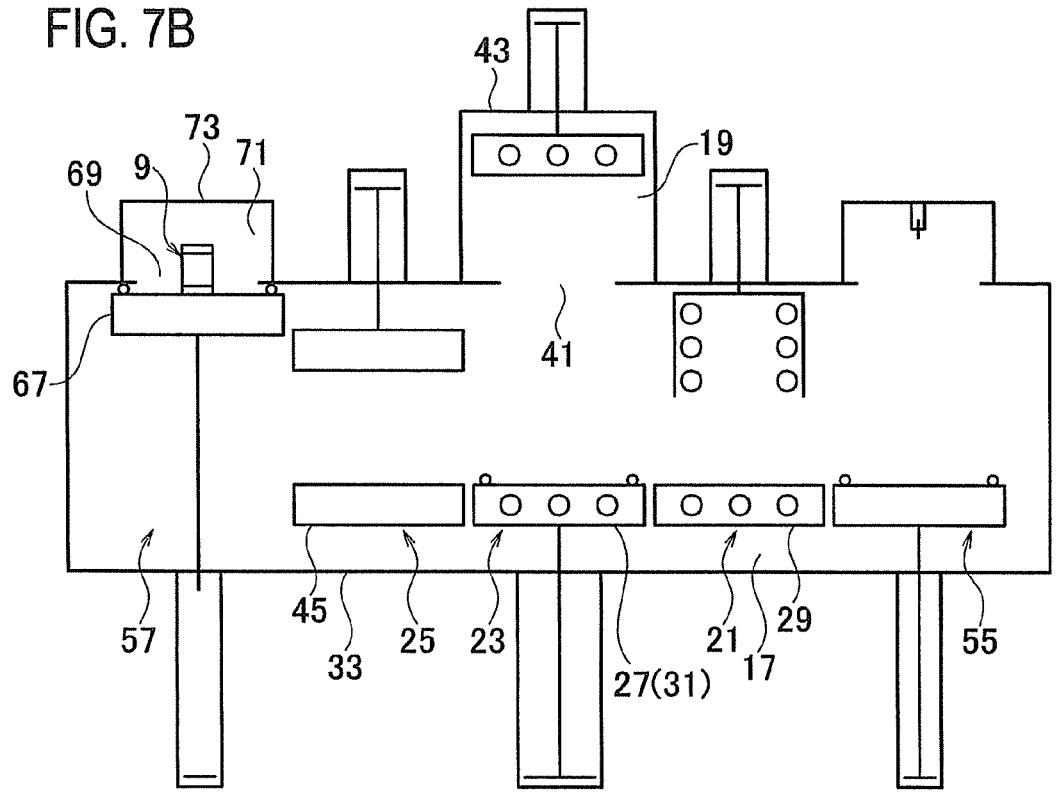
FIG. 7B is a block diagram of the device, where a pedestal carrying the glass semi-product moves up to insert the die set along with the glass semi-product into a carry-out sub-chamber.

Referring to FIG. 7B, the cylinder 127 is operated to move the pedestal 67 up so that the die module 9 placed on the pedestal 67 is introduced into the export chamber 71 and the pedestal 67 gas-tightly closes the third through-hole 69.

Referring to FIG. 8A, the motor on the pivot of the chassis 73 is operated to pivotally open the chassis 73 so as to expose the export chamber 71. The die module 9 on the pedestal 67 can be carried out by hands or any conveyor means not shown.

Figure 8B:
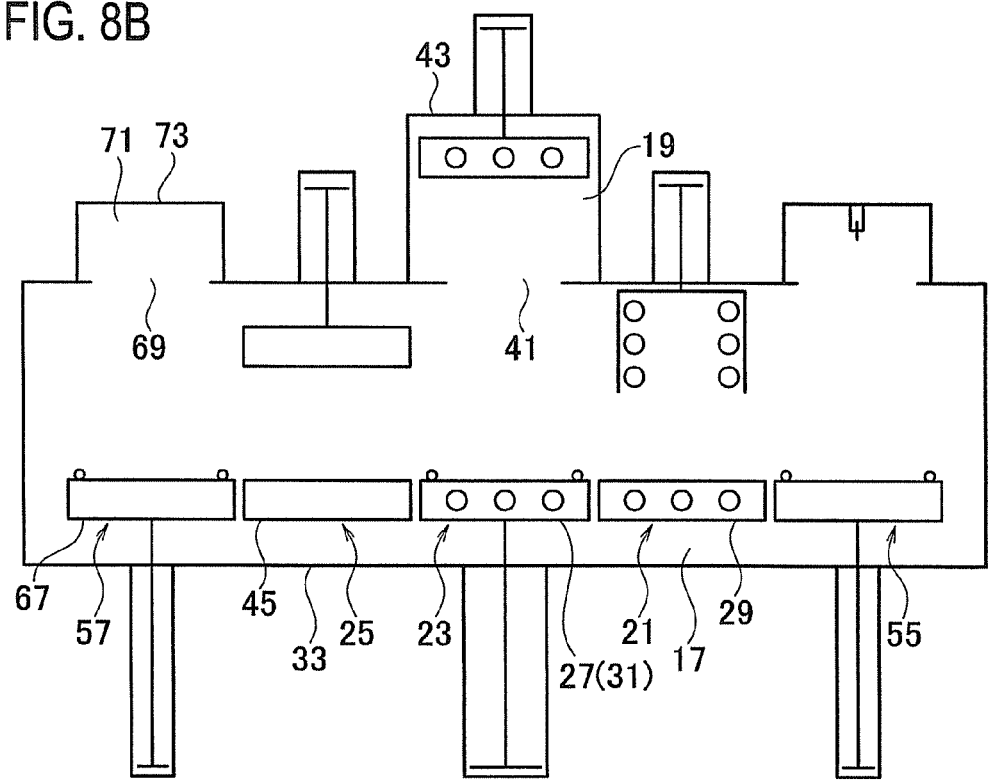
FIG. 8B is a block diagram of the device, where the carry-out sub-chamber is closed again.
Figure 10:
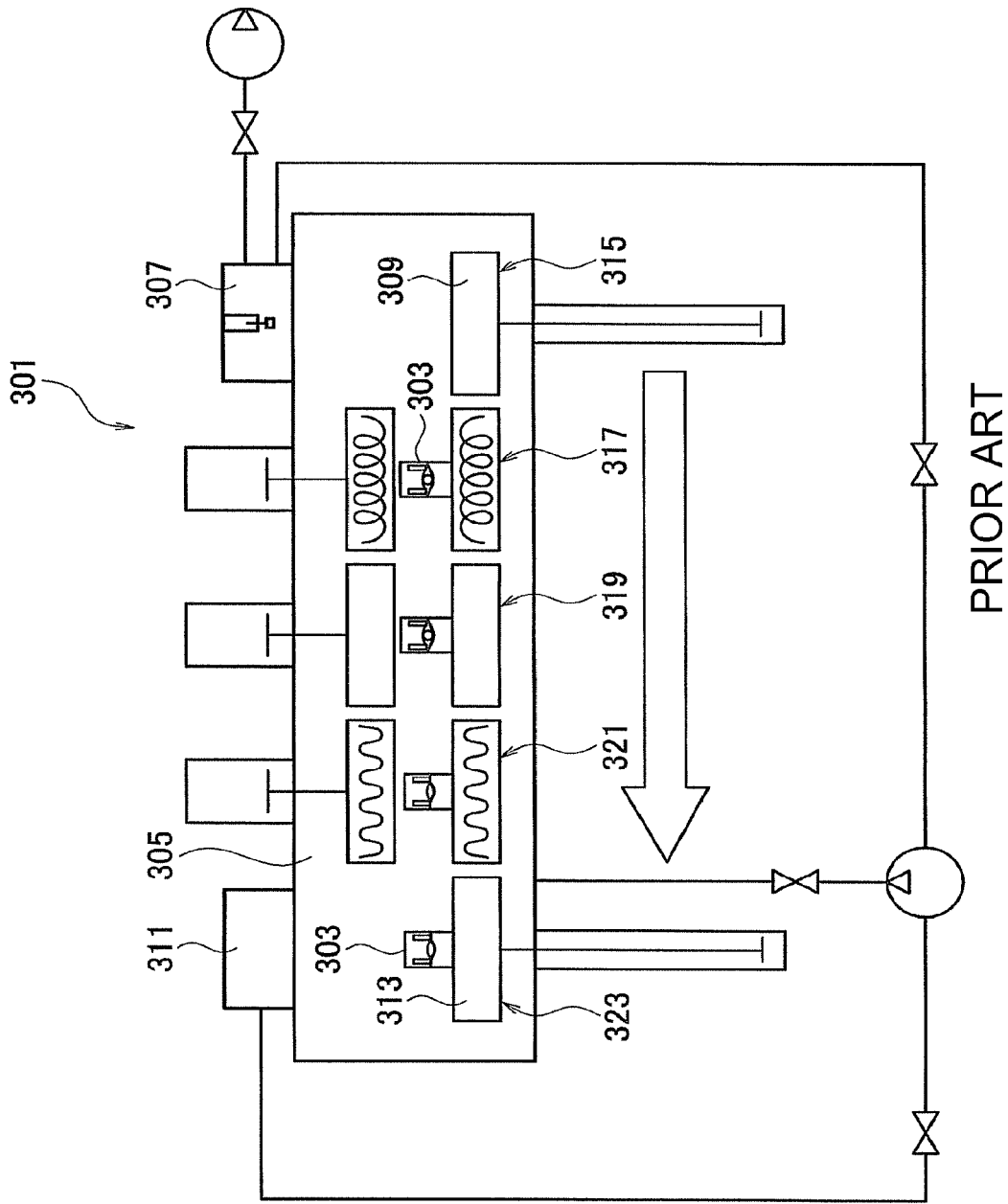
FIG. 10 is a block diagram showing a prior art device.

Referring to FIG. 8B, the motor on the pivot of the chassis 73 is reversely operated to pivotally close the chassis 73 and the pump 87 and the valve 85 are operated to fill the export chamber 71 with the inert gas. Subsequently the cylinder 127 is reversely operated to move the pedestal 67 down. Then the device 1 is ready for coming back to the state shown in FIG. 3A.

The die module 9 carried out of the device 1 is ready for disassembly and thus the final product 11 can be picked out. Of course the die set 10 separated from the final product 11 is reusable.

In the description above, for convenience of explanation, only one die module is thrown into the device and thus the press-forming process is carried out as a batch production. The process, however, can be carried out as a continuous production, in which plural die modules are routed sequentially through each step. For example, when a first die module reaches the heating zone, the carry-in zone and the import chamber can receive a next die module. The same applies to a relation between the sub-chamber and the heating zone, and such.

According to the device 1 of the present embodiment, as the main chamber is atmosphere-controllable and the sub-chamber can be evacuated when it carries out press-forming, the inert gas such as nitrogen in the main chamber prevents all the components in the main chamber from being oxidized and simultaneously the vacuum in the sub-chamber prevents gas infiltration into the glass. Therefore any gas does not disturb press-forming. The inert gas further prevents temperature nonuniformity in the glass semi-products because the inert gas functions as a thermal medium.

The present embodiment enables formation of smooth surfaces or microstructures on surfaces of the final products. The final products therefore can be improved in quality and/or properties. The device of the present embodiment could be used in production of fly-eye lenses or other products requiring excellent properties.

Although the sub-chamber, the import chamber and the export chamber are separately provided from the main chamber, the structure as a whole can be made simple because any independent components are not required to partition the device into these chambers. The movable pedestals instead function as partitions. In other words, the present embodiment omits a partition with retention of its function.

The present embodiment assures gas-tight sealing sufficiently resistive against high temperatures because metal seals or any heat-resistant O-rings are used.

The device of the present embodiment only require the upper ram to carry out the press-forming but does not require a lower ram because the pedestal takes the place of the lower ram. In other words, the present embodiment omits a lower ram with retention of its function.

The present embodiment reduces contamination in the inert gas in the main chamber because the import chamber and the export chamber blocks intrusion of air when the die module is carried in or out.

The number of zones or transport devices for transporting the die modules among the zones is of course arbitrarily selected.

Although the invention has been described above by reference to certain embodiments of the invention, the invention is not limited to the embodiments described above. Modifications and variations of the embodiments described above will occur to those skilled in the art, in light of the above teachings.

What is claimed is:

1. A device for forming a glass semi-product loaded in a die set, comprising:
   a first chamber enclosing a heating zone, a waiting zone and a cooling zone arranged in a row along a first direction and being controllable of an atmosphere in the first chamber;
   a second chamber in spatial communication with the first chamber and closable so as to keep vacuum in the second chamber, the second chamber so neighboring on the waiting zone as to receive a die set moving from the waiting zone in a second direction perpendicular to the first direction; and
   a ram disposed in the second chamber and movable to get contact with the die set and carry out press-forming on the glass semi-product in the vacuum kept in the second chamber.

2. The device of claim 1, further comprising:
   a first through-hole establishing the spatial communication between the first chamber and the second chamber, the first through-hole being disposed in the second direction from the waiting zone; and
   a movable pedestal capable of carrying the die set, the pedestal being so dimensioned as to close the first through-hole when the pedestal moves in the second direction from the waiting zone to the first through-hole.

3. The device of claim 2, further comprising:
   a metal seal so disposed as to surround the first through-hole and gas-tightly seal the second chamber when the pedestal comes in contact with the metal seal.

4. The device of claim 2, wherein the ram is so disposed as to put the die set between the ram and the pedestal moved in the second chamber, whereby the press-forming is carried out.

5. The device of claim 2, further comprising:
   a third chamber in spatial communication with the first chamber;
   a second through-hole establishing the spatial communication between the first chamber and the third chamber, the second through-hole being so dimensioned that the pedestal gas-tightly closes the second through-hole when the pedestal moves to the second through-hole;
   a fourth chamber in spatial communication with the first chamber; and
   a third through-hole establishing the spatial communication between the first chamber and the fourth chamber, the third through-hole being so dimensioned that the pedestal gas-tightly closes the second through-hole when the pedestal moves to the second through-hole,
   wherein each of the third chamber and the fourth chamber is so structured as to have its interior exposed to the exterior, whereby the third chamber and the fourth chamber can be used to carry the glass semi-product into the first chamber and carry a final product out of the first chamber.

6. The device of claim 5, wherein the first chamber further defines a carry-in zone and a carry-out zone arranged at both ends of the row of the heating zone, the waiting zone and the cooling zone, the third chamber neighbors on the carry-in zone as to carry the die set to the carry-in zone in the second direction, and the fourth chamber neighbors on the carry-out zone as to carry the die set out of the carry-out zone in the second direction.

* * * * *